(12) United States Patent
Felix et al.

(10) Patent No.: US 12,643,312 B2
(45) Date of Patent: Jun. 2, 2026

(54) ACOUSTIC BLANKET

(71) Applicant: Blue Origin Manufacturing, LLC, Huntsville, AL (US)

(72) Inventors: Melissa Audrey Felix, Seattle, WA (US); John Vincent Riccione, Newcastle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 461 days.

(21) Appl. No.: 18/317,717

(22) Filed: May 15, 2023

(65) Prior Publication Data

US 2024/0383238 A1 Nov. 21, 2024

(51) Int. Cl.
B32B 27/06 (2006.01)
B32B 3/26 (2006.01)
(Continued)

(52) U.S. Cl.
CPC ............ B32B 27/065 (2013.01); B32B 3/266 (2013.01); B32B 5/18 (2013.01); B32B 7/02 (2013.01);
(Continued)

(58) Field of Classification Search
CPC ......... B32B 27/065; B32B 3/266; B32B 5/18; B32B 7/02; B32B 7/05; B32B 7/14;
(Continued)

(56) References Cited

U.S. PATENT DOCUMENTS 4,488,619 A * 12/1984 O'Neill ..................... B32B 7/12
428/317.1
4,743,488 A * 5/1988 Jones ........................ B32B 7/12
428/317.1
(Continued)

FOREIGN PATENT DOCUMENTS

CN        104439686 B      3/2015
CN        104827719 A *    8/2015    ............. B32B 27/42
(Continued)

OTHER PUBLICATIONS

Machine translation of CN_104827719_A (Year: 2015).*
(Continued)

*Primary Examiner* — Forrest M Phillips
*Assistant Examiner* — Jennifer B Olson
(74) *Attorney, Agent, or Firm* — Summit Patents, PC

(57) ABSTRACT

An acoustic blanket absorbs acoustic energy and reduces noise in a launch vehicle. The acoustic blanket may be overlaid on a wall of a payload fairing of the launch vehicle. Materials and construction of the acoustic blanket allow for a relatively thin and light sound barrier. The acoustic blanket may comprise vertically-lapped polyester that is overlaid with a lightweight melamine foam. This combination of materials creates an acoustic impedance mismatch between layers that leads to absorption of acoustic energy across a relatively broad range of frequency bands. The acoustic blanket has a particular heat seal pattern that helps absorb noise while allowing the acoustic blanket to be relatively soft and flexible, which is useful for attaching the acoustic (Continued)

blanket to a curved wall of a fairing or other launch vehicle shapes. The acoustic blanket utilizes micro-perforations on multiple sides to allow for movement of air/venting while maintaining the bulk materials inside.

20 Claims, 4 Drawing Sheets

(51) Int. Cl.

| | |
|---|---|
| *B32B 5/18* | (2006.01) |
| *B32B 7/02* | (2019.01) |
| *B32B 7/14* | (2006.01) |
| *B32B 27/08* | (2006.01) |
| *B32B 27/36* | (2006.01) |
| *B32B 37/06* | (2006.01) |
| *B64C 7/00* | (2006.01) |
| *B64C 1/00* | (2006.01) |

(52) U.S. Cl.
CPC .............. *B32B 7/14* (2013.01); *B32B 27/08* (2013.01); *B32B 27/36* (2013.01); *B32B 37/065* (2013.01); *B64C 7/00* (2013.01); *B32B 2266/0285* (2013.01); *B32B 2305/022* (2013.01); *B32B 2307/102* (2013.01); *B32B 2307/518* (2013.01); *B32B 2307/72* (2013.01); *B32B 2367/00* (2013.01); *B32B 2379/00* (2013.01); *B64C 2001/0072* (2013.01)

(58) Field of Classification Search
CPC ....... B32B 27/08; B32B 27/36; B32B 37/065; B32B 2266/0285; B32B 2305/022; B32B 2307/102; B32B 2307/518; B32B 2307/72; B32B 2367/00; B32B 2379/00; B60R 13/08; B61D 17/185; B62D 33/0604; B64C 1/40; B64C 1/403; B64C 1/406; B64C 7/00; B64C 2001/0072; B65B 7/2878; B65B 7/164; B65B 13/32; F02B 77/11; G10K 11/178
USPC ................................................. 181/211, 293
See application file for complete search history.

(56) References Cited

U.S. PATENT DOCUMENTS

| | | | |
|---|---|---|---|
| 5,901,557 A | 5/1999 | Grayson | |
| 6,591,867 B2 | 7/2003 | Grayson | |
| 6,620,495 B1 * | 9/2003 | Kobayashi | B29C 44/3484 |
| | | | 428/178 |
| 6,840,275 B2 | 1/2005 | Grayson | |
| 7,048,879 B2 * | 5/2006 | Kobayashi | B32B 38/06 |
| | | | 264/45.4 |
| 8,061,475 B2 * | 11/2011 | Mori | B32B 5/28 |
| | | | 181/290 |
| 8,272,424 B2 | 9/2012 | Short | |
| 8,348,136 B1 | 1/2013 | Potter et al. | |
| 9,101,979 B2 | 8/2015 | Hofmann et al. | |
| 9,309,666 B2 * | 4/2016 | Blanchard | B32B 7/14 |
| 9,610,650 B2 | 4/2017 | Hofmann et al. | |
| 10,174,675 B2 | 1/2019 | Martinez et al. | |
| 10,421,249 B2 * | 9/2019 | Mori | B32B 27/12 |
| 11,072,145 B2 * | 7/2021 | Mihalcik | B32B 5/18 |
| 11,351,752 B2 * | 6/2022 | Lord | B32B 27/12 |
| 2010/0242843 A1 | 9/2010 | Peretti et al. | |
| 2015/0137412 A1 | 5/2015 | Schalansky | |
| 2016/0169012 A1 | 6/2016 | Dacunha | |
| 2020/0331230 A1 * | 10/2020 | Bush | B32B 3/266 |
| 2021/0363748 A1 * | 11/2021 | Drexler | B32B 5/26 |
| 2023/0279985 A1 * | 9/2023 | Lord | B32B 5/02 |
| | | | 442/223 |

FOREIGN PATENT DOCUMENTS

| | | | |
|---|---|---|---|
| CN | 204712541 U | * | 10/2015 |
| JP | 2012057203 A | | 3/2012 |
| WO | WO-02095111 A1 * | 11/2002 | ............... D04H 1/74 |

OTHER PUBLICATIONS

Machine translation of CN-204712541-U (Year: 2015).*

Edwin Ethridge, Ph.D., "Using Microwaves for Extracting Water from the Moon," COMSOL Conference, Boston, MA, Oct. 9, 2009.

Eric E. Rice, "Development of Lunar Ice/Hydrogen Recovery System Architecture," Universities Space Research Association (USRA), Jan. 1, 2000.

Robert Youngquist, John Lane, Christopher Immer, and James Simpson, "Pumping Liquid Oxygen by Use of Pulsed Magnetic Fields," NASA Tech Briefs, John F. Kennedy Space Center, Florida, Feb. 2004.

Stephen Hoffman et al., "Mining" Water Ice on Mars An Assessment of ISRU Options in Support of Future Human Missions, Jul. 2016.

Steve Roy, Marshall Space Flight Center News Releases, "Cooking Up Water From the Moon? NASA Studies Water Extraction With Microwaves" Oct. 19, 2009, https://www.nasa.gov/centers/marshall/news/news/releases/2009/09-083.html.

Tanya Lewis, "Incredible Technology: How to Mine Water on Mars," Incredible Technology, Dec. 23, 2013, https://www.space.com/24052-incredible-tech-mining-mars-water.html.

* cited by examiner

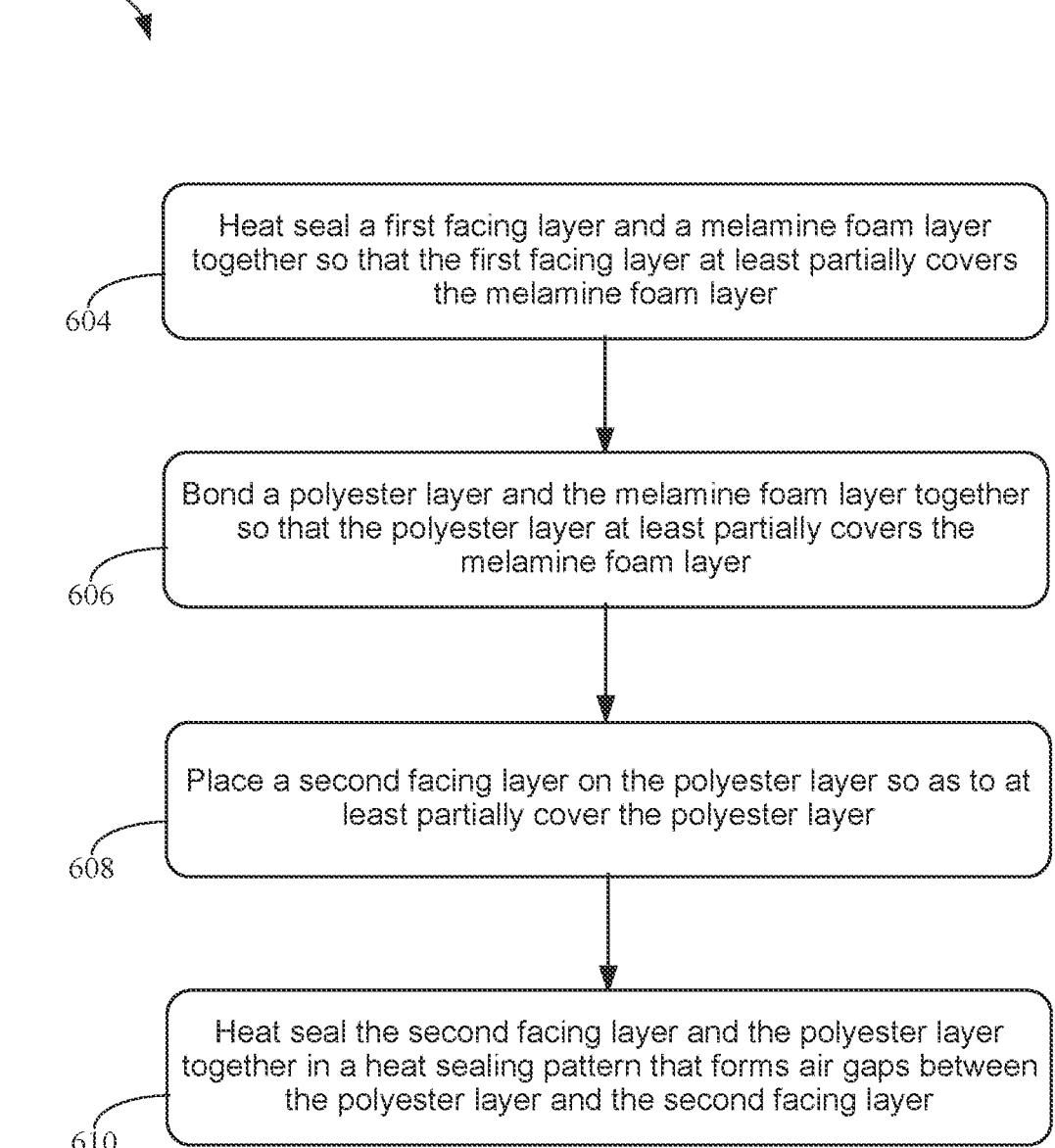

602

604
Heat seal a first facing layer and a melamine foam layer together so that the first facing layer at least partially covers the melamine foam layer 606
Bond a polyester layer and the melamine foam layer together so that the polyester layer at least partially covers the melamine foam layer 608
Place a second facing layer on the polyester layer so as to at least partially cover the polyester layer 610
Heat seal the second facing layer and the polyester layer together in a heat sealing pattern that forms air gaps between the polyester layer and the second facing layer

FIG. 6

ACOUSTIC BLANKET

BACKGROUND

Payload fairings of launch vehicles are intended to protect payloads, such as satellites to be lifted into orbit, against damage on the launchpad as well as during flight through the atmosphere. Because of their position on the nose of the launch vehicle, payload fairings are generally subjected to strong aerodynamic interactions that generate acoustic energy. Additionally, launch vehicles are subjected to very high noise during lift-off under partial or full thrust. Such intense acoustic loads can damage the payload. If a launch vehicle includes personnel, then consideration must also be given to their protection from these acoustic loads.

The structure of a payload fairing offers some protection against acoustic loads but is generally insufficient so that additional measures are often required. One such measure is to add sound-absorbing materials, such as insulating panels or mats, to the walls of the payload fairing. The design of acoustic protection on payload fairings of launch vehicles, however, needs to consider the high importance of mass and volume, which are critical features for space vehicles. Thus, some measures for protection against acoustic loads may sufficiently block or absorb sound energy, but would be relatively heavy and too large, so that valuable payload accommodation volume and performance would be lost.

Achieving acoustic absorption without increasing the thickness of an absorber and increasing acoustic transmission loss with only an incremental mass increase are both difficult problems, especially in the low frequency range. One way to control low-frequency noise, which generally falls within the frequency range of the above-mentioned acoustic loads, is to use melamine or polyimide foam (or a combination of both) and to increase their thickness in accordance to needed performance. Older launch vehicles used fiberglass. Unfortunately, low frequency acoustic performance of these materials only increases by substantially increasing their thickness (and consequently their mass).

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6 is a flow diagram of a process of fabricating an acoustic blanket, according to some embodiments.

DETAILED DESCRIPTION

Figures 1, 2:
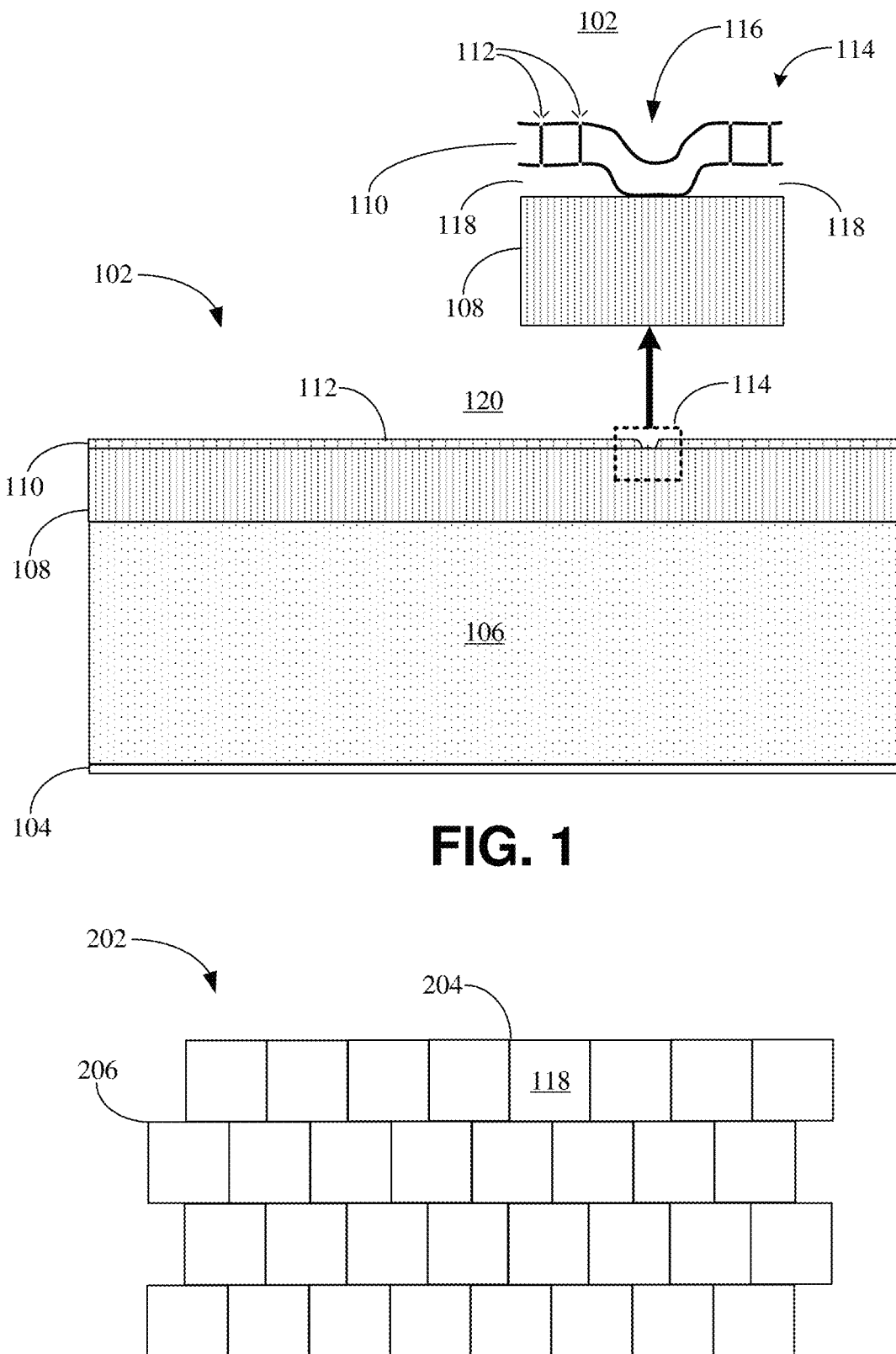
FIG. 1 is a cross-section view of a portion of an acoustic blanket, according to some embodiments.
FIG. 2 is a top view of a portion of an acoustic blanket, illustrating a heat seal pattern, according to some embodiments.

This disclosure describes an acoustic blanket, and methods of its fabrication, to absorb acoustic energy and reduce noise in a launch vehicle. For example, the acoustic blanket may be overlaid on the interior (e.g., inside walls) of a payload fairing of the launch vehicle. Materials and construction of the acoustic blanket allow for a relatively thin and light sound barrier, which are characteristics that are very important for a launch vehicle.

In some embodiments, the acoustic blanket comprises relatively dense vertically-lapped polyester that is overlaid with a lightweight melamine foam. This combination of materials (e.g., a dense material adjacent to a lightweight material) creates an acoustic impedance mismatch between the layers that leads to desired absorption of acoustic energy across a relatively broad range of frequency bands. For a particular example, a dense material having a density of 1.25 pounds per cubic foot (PCF) and a lightweight material having a density of 0.375 PCF may result in a factor of 3.3 impedance mismatch. Noise during the launch of a launch vehicle generally falls within these frequency bands. As explained below, the acoustic blanket has a particular heat seal pattern that allows the acoustic blanket to be relatively soft and flexible, which helps absorb noise. Such flexibility is useful for attaching the acoustic blanket to a curved wall of a fairing or other launch vehicle shapes, for example.

In some embodiments, an acoustic blanket may include a first facing layer that at least partially covers a melamine foam layer, and a polyester layer that at least partially covers the melamine foam layer. In some implementations, the melamine foam may be ultra-light melamine foam and the polyester may be dense vertically-lapped polyester, though claimed subject matter is not limited in this respect. A second facing layer at least partially covers the polyester layer. In other words, a melamine foam layer and a polyester layer are sandwiched between two facing layers, both of which may be Mylar, Kapton, or other similarly thin and flexible material, for example. Air gaps are formed between the polyester layer and the second facing layer and are partitioned from one another by a heat seal pattern between the polyester layer and the second facing layer. The second facing layer may include micro-perforations that allow for movement of air between the air gaps and outside the acoustic blanket.

In some embodiments, a method of fabricating such an acoustic blanket may include bonding the first facing layer to the melamine foam layer so that the first facing layer at least partially covers the melamine foam layer. The polyester layer may then be bonded to the melamine foam layer so that the polyester layer at least partially covers the melamine foam layer. The method also includes placing a second facing layer on the polyester layer so as to at least partially cover the polyester layer, and heat sealing the second facing layer and the polyester layer together in a heat seal pattern. In some implementations, the heat seal pattern forms air gaps between the polyester layer and the second facing layer.

FIG. 1 is a cross-section view of a portion of an acoustic blanket 102, according to some embodiments. Acoustic blanket 102 may include a first facing layer 104 that at least partially covers a melamine foam layer 106, and a polyester layer 108 that at least partially covers melamine foam layer 106. As mentioned above, the melamine foam (e.g., layer 106) may be ultra-light melamine foam and the polyester (e.g., layer 108) may be dense vertically-lapped polyester, which may provide a number of advantages. For example, the vertically-lapped structure may allow for relatively high flexibility such that the acoustic blanket may bend to conform a curved wall of a fairing, for instance. Additionally, the vertically-lapped structure provides for relatively high acoustic absorption.

A second facing layer 110 at least partially covers polyester layer 108 and these two layers are attached to each other in a heat seal pattern by heat sealing, as described below. First and second facing layer 104 and 110 may be Mylar, for example. Second facing layer 110 includes micro-perforations 112, as illustrated by inset 114, which is a close-up view of a portion of second facing layer 110 and polyester layer 108. Illustrated in this close-up view are a heat seal 116 and air gaps 118 between polyester layer 108 and second facing layer 110, and the micro-perforations in the second facing layer. Heat seal 116 is a portion of a heat seal pattern that forms air gaps 118 between polyester layer 108 and second facing layer 110. Air gaps 118 are partitioned from one another by the heat seal pattern, as described below. Micro-perforations 112 allow for movement of air between air gaps 118 and outside 120 (e.g., exterior to) the acoustic blanket. This heat seal methodology may also be used between the first facing layer 104 and melamine foam 106.

In some particular implementations, polyester layer 108 may have a density of about 1.25 PCF and a thickness of about 1 inch. Melamine foam (e.g., layer 106) may have a density of about 0.375 PCF and a thickness in a range of about 3 to 5 inches. The polyester layer (e.g., layer 108) may be dense vertically-lapped by about a hundred folds per inch, though claimed subject matter is not limited with respect to these example values.

Though not illustrated, in some implementations, facing layers 104 and/or 110 may wrap around sides of acoustic blanket 102. These side portions of the facing layers may include micro-perforations, which may be useful for at least partially controlling venting paths of air inside the acoustic blanket. For example, one or both top sheets (e.g., facing layers) of the acoustic blanket may be without perforations while the four sides of the acoustic blanket include perforations. In other implementations, sides of acoustic blanket 102 may be covered with a Mylar (or similar) tape that adheres to the sides of the polyester and melamine layers. The edges of that Mylar tape may be themselves closed with thinner Mylar tape.

FIG. 2 is a top view of a portion of acoustic blanket 102, illustrating a heat seal pattern 202 that partially bonds second facing layer 110 to polyester layer 108, according to some embodiments. Heat seal 116 is part of heat seal pattern 202. As mentioned above, the heat seal pattern forms air gaps 118 between second facing layer 110 and polyester layer 108 that are partitioned by the heat seal pattern. The heat seal process may be a hot-melt process, wherein there may be a heat seal material between the polyester layer and the second facing layer. These two layers do not melt, but instead the seal material between them melts and sticks to both the facing layer and the polyester layer, for example. As mentioned above, a heat seal may also exist between first facing layer 104 and melamine 106.

In some implementations, the surface area of air gaps 118 (e.g., in a plan view) is substantially greater than the surface area of the heat seal pattern. In other words, and in a particular example, the surface area ratio of air gaps to the heat seal pattern may be greater than about 90% (e.g., an approximate range between 85% and 95%). For a particular example, heat seals (e.g., 116) may be about 0.25 inches wide and distances between adjacent heat seals may be about 5 inches. Heat seal pattern 202 may be substantially rectangular or square, comprising vertical pattern portions 204 and horizontal pattern portions 206. Such rectangles or squares may be offset from one another in a staggered fashion, as illustrated in FIG. 2, though claimed subject matter is not so limited. Corners of the squares or rectangles may have a rounded corner radius of about 0.25 inches in some implementations.

Figure 3:
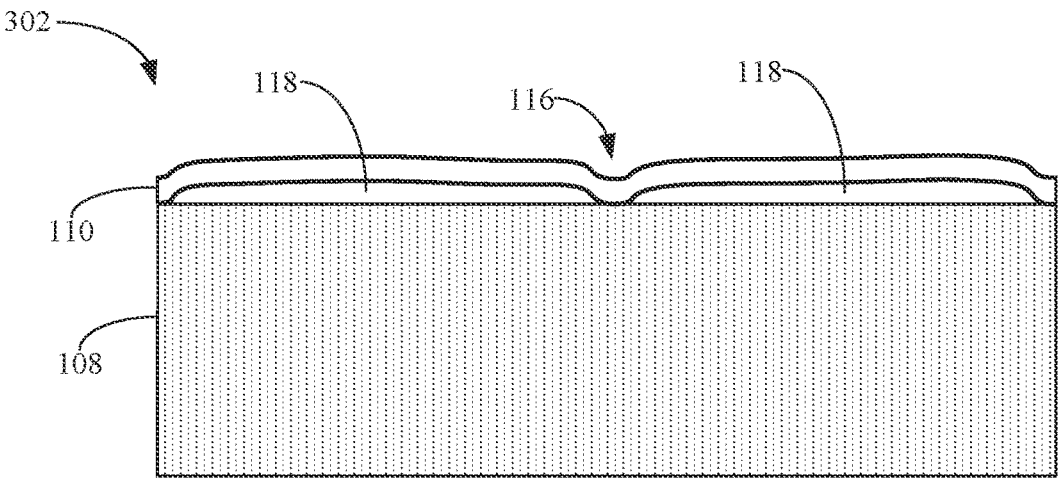
FIG. 3 is a cross-section view of a portion of an acoustic blanket, illustrating air pockets among the heat seal pattern, according to some embodiments.

FIG. 3 is a cross-section view of a portion 302 of acoustic blanket 102, illustrating air gaps 118 and heat seal 116, which is part of heat seal pattern 202, according to some embodiments. In a particular implementation, facing layer 110 may be Mylar having a nominal 0.001 inch thickness. There may be tradeoffs between increased strength with protection against tearing and flexibility when selecting a thickness for facing layer 110.

Figure 4:
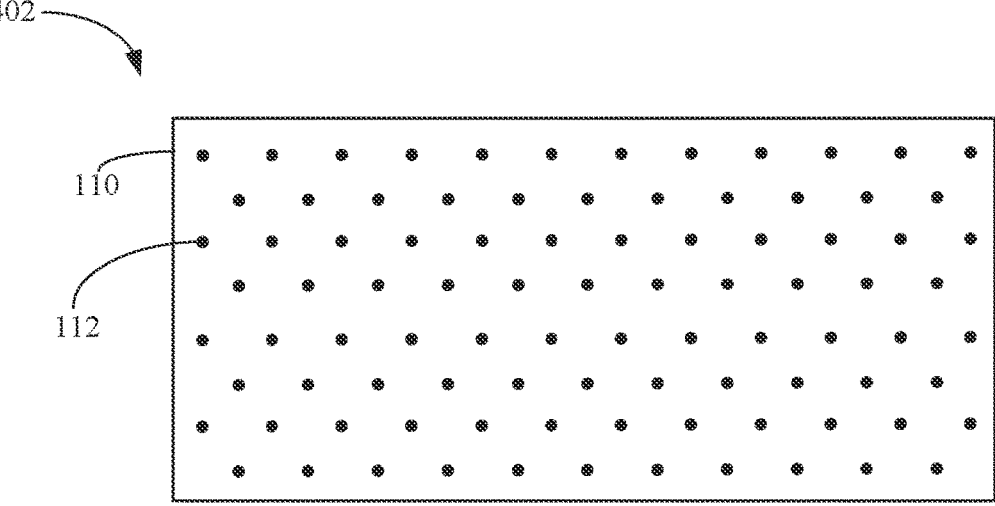
FIG. 4 is a top close-up view of a portion of an acoustic blanket, illustrating micro-perforations, according to some embodiments.

FIG. 4 is a top close-up view of a portion 402 of acoustic blanket 102, illustrating micro-perforations 112 in second facing layer 110, according to some embodiments. For example, micro-perforations 112 may have a nominal diameter of about 100 microns and an on-center spacing of about 1.9 mm. Micro-perforations 112 may staggered so they are offset by 45 degrees.

In some implementations, second facing layer 110 may comprise a permeable material and need not include micro-perforations 112. In still other implementations, facing layers 104 and 110 may not be perforated, as mentioned above. Instead, the sides of acoustic blanket 102 may be perforated. For example, one or both top sheet (e.g., facing layers) of the acoustic blanket may be without perforations while the four sides of the acoustic blanket include perforations. These latter perforations may have a pattern that is different from the pattern illustrated in FIG. 4. For example, micro-perforations of the sides of the acoustic blanket may be in an orthogonal arrangement of rows and columns (e.g., a rectangular grid pattern) with on-center spacing of about 0.25 inches. The micro-perforations may have a nominal diameter of about 0.043 inches.

Figure 5:
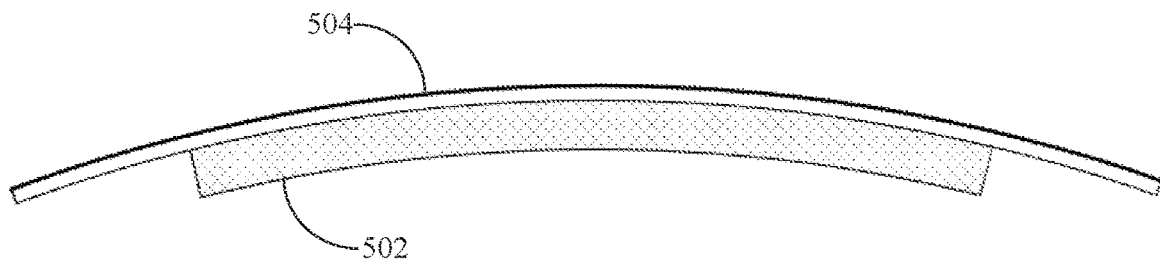
FIG. 5 is a cross-section view of an acoustic blanket mounted onto a portion of a fairing of a launch vehicle, according to some embodiments.

FIG. 5 is a cross-section view of an acoustic blanket 502 mounted onto a portion of a fairing 504, according to some embodiments. For example, acoustic blanket 502 may be the same as or similar to acoustic blanket 102. As mentioned above, features such as the relatively small heat seal surface area and properties of the individual layers allow the acoustic blanket to be substantially flexible. Such flexibility provides an advantage in that the acoustic blanket may conform to the curvature of a fairing, which may, for example, have a radius of curvature of about three or so meters.

FIG. 6 is a flow diagram of a process 602 of fabricating an acoustic blanket, according to some embodiments. For example, the acoustic blanket may be the same as or similar to 102, described above. Process 602 may be performed by a fabricator. At 604, the fabricator may heat seal a first facing layer, such as 104, and a melamine foam layer, such as 106, together so that the first facing layer at least partially covers the melamine foam layer. The first facing layer and the melamine foam layer may be bonded together with a heat seal pattern. At 606, the fabricator may bond a polyester layer, such as 108, and the melamine foam layer together so that the polyester layer at least partially covers the melamine foam layer. At 608, the fabricator may place a second facing layer, such as 110, on the polyester layer so as to at least partially cover the polyester layer. At 610, the fabricator may heat seal the second facing layer and the polyester layer together in a heat seal pattern (e.g., 202) that forms air gaps, such as 118, between the polyester layer and the second facing layer. In some implementations, there may be a heat seal pattern on both sides of the acoustic blanket. For example, the heat seal pattern between the first facing layer and the melamine foam layer may be the same as or similar to the heat seal pattern between the second facing layer and the polyester layer. Such heat sealing on both sides of the acoustic blanket (e.g., both the back and the front facing layers are attached to their underlying blanket layers with a heat sealing pattern) may help contribute to the overall flexibility of the blanket.

Figure 7:
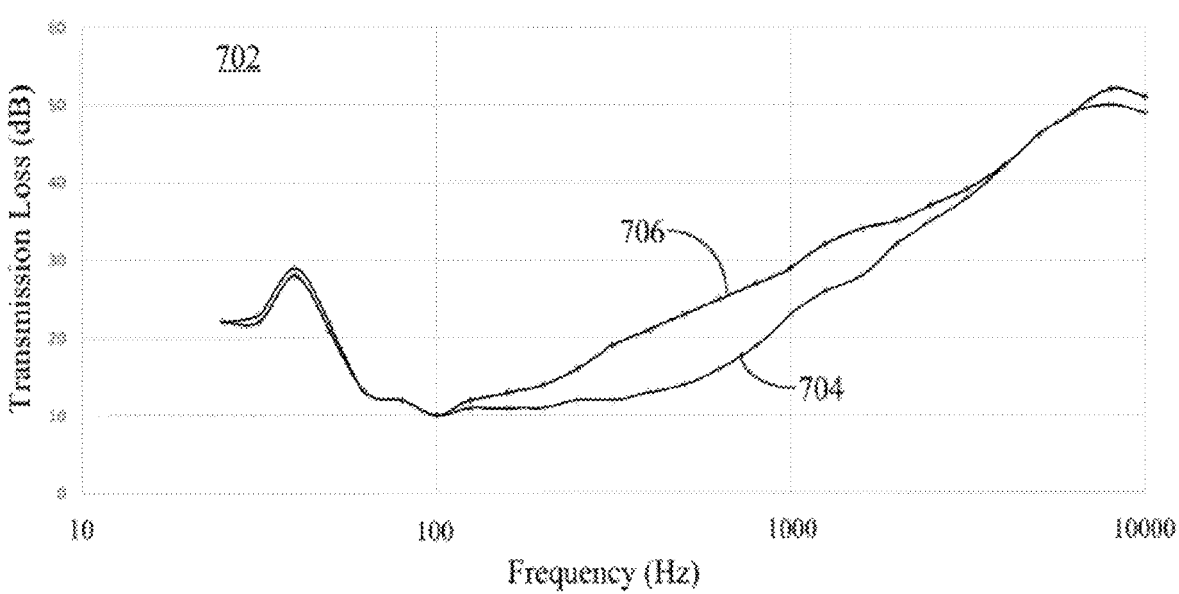
FIG. 7 is a graph of acoustic transmission loss through two types of acoustic barriers as a function of frequency, according to some embodiments.

FIG. 7 is a graph 702 of acoustic transmission loss through a traditional acoustic barrier and an acoustic blanket, as described herein, as a function of frequency, according to some embodiments. Graph 702 was generated from experimental data acquired for a four inch thick sample of traditional melamine foam, represented by plot 704, and a four inch thick sample of an acoustic blanket similar to or the same as 102, represented by plot 706. As illustrated in graph 702, the acoustic blanket outperforms the traditional melamine by having a substantially higher transmission loss between 100 Hz and 4000 Hz.

Figure 8:
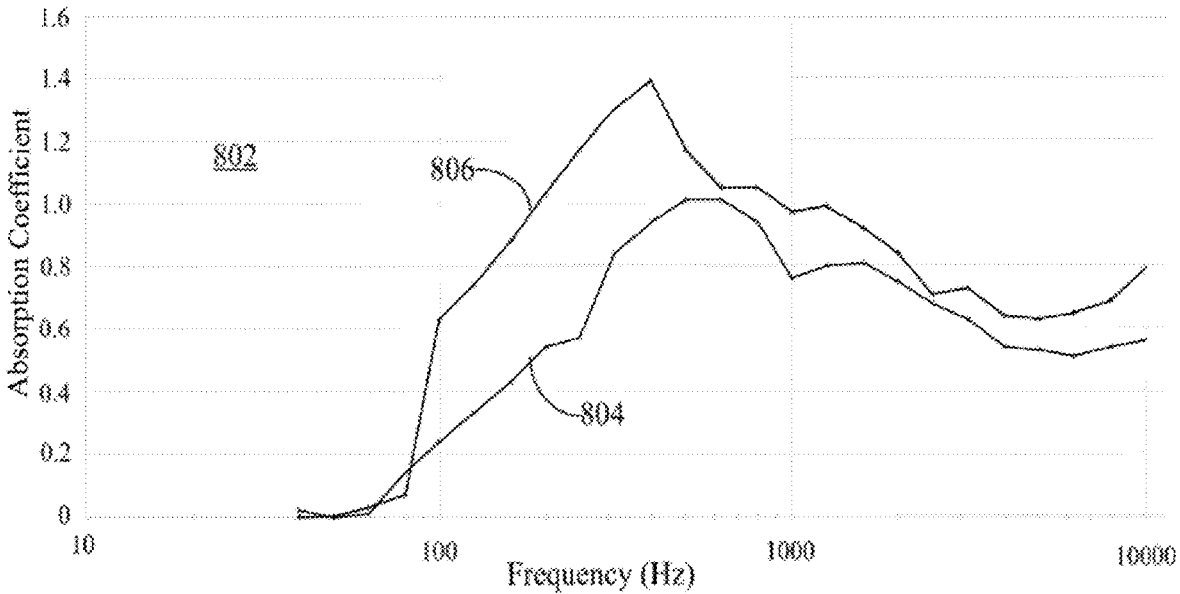
FIG. 8 is a graph of the acoustic absorption coefficient of two types of acoustic barriers as a function of frequency, according to some embodiments.

FIG. 8 is a graph 802 of the acoustic absorption coefficient of a traditional acoustic barrier and an acoustic blanket, as described herein, as a function of frequency, according to some embodiments. Graph 802 was generated from experimental data acquired for a four inch thick sample of traditional melamine foam, represented by plot 804, and a four inch thick sample of an acoustic blanket similar to or the same as 102, represented by plot 806. As illustrated in graph 802, the acoustic blanket outperforms the traditional melamine by having a substantially higher acoustic absorption coefficient from below 100 Hz to past 10,000 Hz.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. An acoustic blanket comprising:
a melamine foam layer;
a first facing layer at least partially covering the melamine foam layer;
a polyester layer at least partially covering the melamine foam layer;
a second facing layer at least partially covering the polyester layer; and
air gaps between the polyester layer and the second facing layer, wherein the air gaps are partitioned from one another by a heat seal pattern between the polyester layer and the second facing layer, wherein a plan-view surface area ratio of the air gaps to the heat seal pattern is greater than 90% and the polyester layer is at least three times the density of the melamine foam layer.

2. The acoustic blanket of claim 1, wherein the second facing layer includes micro-perforations that allow for movement of air between the air gaps and outside the acoustic blanket.

3. The acoustic blanket of claim 1, wherein the polyester layer comprises a vertically-lapped polyester layer.

4. The acoustic blanket of claim 3, wherein the vertically-lapped polyester layer has a density of about 1.25 pounds per cubic foot.

5. The acoustic blanket of claim 1, wherein the first facing layer or the second facing layer is mylar.

6. The acoustic blanket of claim 1, wherein the melamine foam layer has a density of about 0.375 pounds per cubic foot.

7. The acoustic blanket of claim 1, wherein the first facing layer and the melamine foam layer comprise materials that can be heat sealed together.

8. The acoustic blanket of claim 1, wherein the second facing layer and the polyester layer comprise materials that can be heat sealed together.

9. The acoustic blanket of claim 1, wherein the heat seal pattern is substantially rectangular or square in plan view and comprises intersecting horizontal and vertical heat-sealed portions arranged in a staggered array to define the air gaps.

10. The acoustic blanket of claim 2, wherein the micro-perforations have micron-scale diameters and are arranged with millimeter-scale on-center spacing.

11. A method of fabricating an acoustic blanket, the method comprising:
bonding, by heat sealing, a first facing layer and a melamine foam layer together so that the first facing layer at least partially covers the melamine foam layer in a first heat seal pattern;
bonding a polyester layer and the melamine foam layer together so that the polyester layer at least partially covers the melamine foam layer;
placing a second facing layer on the polyester layer so as to at least partially cover the polyester layer; and
heat sealing the second facing layer and the polyester layer together in a second heat seal pattern that forms air gaps between the polyester layer and the second facing layer, wherein a plan-view surface area ratio of the air gaps to the first or the second heat seal patterns is greater than 90%, and the polyester layer is at least three times the density of the melamine foam layer.

12. The method of claim 11, wherein the second facing layer includes micro-perforations that allow for movement of air between the air gaps and outside the acoustic blanket.

13. The method of claim 11, wherein the polyester comprises vertically-lapped polyester.

14. The method of claim 13, wherein the vertically-lapped polyester has a density of about 1.25 pounds per cubic foot.

15. The method of claim 11, wherein the first facing layer or the second facing layer is mylar.

16. The method of claim 11, wherein the melamine foam layer has a density of about 0.375 pounds per cubic foot.

17. The method of claim 11, wherein the side layers are permeable to allow for movement of air.

18. The method of claim 11, wherein the second facing layer includes a permeable membrane that allows for movement of air between the air gaps and outside the acoustic blanket.

19. The method of claim 11, wherein heat sealing the second facing layer and the polyester layer comprises applying a hot-melt seal material between the second facing layer and the polyester layer such that the seal material melts and bonds to each layer without melting either the second facing layer or the polyester layer.

20. The method of claim 11, further comprising heat sealing the first facing layer to the melamine foam layer in a third heat seal pattern that is substantially the same as the second heat seal pattern.

* * * * *